United States Patent Office 3,579,507
Patented May 18, 1971

3,579,507
7α,8α-DIFLUOROMETHYLENE STEROIDS
David J. Marshall, Hampstead, Quebec, and Amedeo A. Failli, Montreal, Quebec, Canada, assignors to American Home Products Corporation, New York, N.Y.
No Drawing. Filed July 28, 1969, Ser. No. 845,538
Int. Cl. C07c 173/00
U.S. Cl. 260—239.5
10 Claims

ABSTRACT OF THE DISCLOSURE

7α,8α-difluoromethylene steroids of the formula

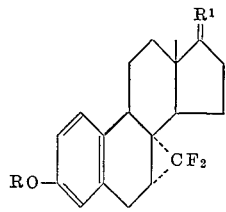

in which R represents hydrogen, lower alkyl or cycloalkyl, or lower aliphatic acyl and $R^1$ represents O (ketonic oxygen) or the group

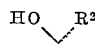

in which $R^2$ represents hydrogen, lower alkyl, lower alkynyl, lower dialkynyl, 2- or 3-furyl, or 2- or 3-thienyl groups.

BACKGROUND OF THE INVENTION

This invention relates to 7α,8α-difluoromethylene steroids. More particularly, this invention relates to 7α,8α-difluoromethylene-1,3,5(10)-estratriene derivatives.

The compounds of this invention are characterized by possessing an outstanding combination of biological activities, having been found to inhibit ovulation in mammals while at the same time possessing only negligible estrogenic and uterotrophic activities. For example, when subjecting these compounds to standard pharmacological tests, for example, to a modification of the test for inhibition of ovulation described in "Methods in Hormone Research," vol. 2, p. 179, Academic Press, New York and London, 1962, they have exhibited utility as ovulation inhibitors when administered orally or subcutaneously.

On the other hand, when subjecting the compounds of this invention to the standard Allen-Doisy and uterotrophic assays for estrogenic activity, described, respectively, in J. Am. Med. Ass., vol. 81, p. 819, (1923) and Endocrinology, vol. 49, p. 429, (1951) they have been found to possess only negligible degrees of activities when administered orally or subcutaneously.

When the compounds of this invention are employed as ovulation inhibitors in mammals, for example in rats, alone or in combination with pharmacologically acceptable carriers, the proportion of the latter is determined by the solubility and the chemical nature of the compound as well as by the chosen route of administration and standard biological practice. For example, they may be administered orally in solid form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular host under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects and preferably at a level that is in a range of from about 2 μg. to about 60 μg. per kilo, although as aforementioned variations will occur. However, a dosage level that is in the range of from about 5μg. to about 30 μg. per kilo is most desirably employed in order to achieve effective results.

SUMMARY OF THE INVENTION

The compounds of this invention may be represented by the formula

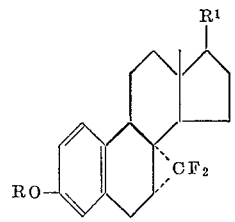

I in which R represents hydrogen, a lower aliphatic acyl group containing from 2–4 carbon atoms, a lower alkyl group containing from 1–8 carbon atoms, a cycloalkyl group containing from 5–7 carbon atoms, or the 2-tetrahydropyranyl group, and $R^1$ represents O (ketonic oxygen) or the group

in which $R^2$ represents hydrogen, a lower alkyl group containing from 1–4 carbon atoms, a lower alkynyl group containing from 2–4 carbon atoms, a lower dialkynyl group containing from 4–8 carbon atoms, the 2-furyl, 3-furyl, 2-thienyl or 3-thienyl groups.

DETAILED DESCRIPTION OF THE INVENTION

The compounds of this invention are prepared by reacting equilin or ethers or esters of equilin with sodium chlorodifluoroacetate in a non-aqueous polar organic solvent at a temperature sufficiently elevated to decompose the latter reagent. Suitable solvents are, for example, diethylene glycol dimethyl ether, dimethylformamide or dimethyl sulfoxide. The reaction may be carried out at temperatures within the range of 80–200° C., with a preferred range of from 130–180° C., and the preferred starting materials are esters or ethers of equilin such as for example, equilin acetate, equilin methyl ether, equilin cyclopentyl ether, or equilin 2-tetrahydrpyranyl ether. In this manner the corresponding 7α,8α-difluoromethylene derivatives are obtained and may be further transformed by conventional methods. For example, ester groups may be removed by treatment with alkaline agents and the tetrathydropyranyl group may be removed by treatment with acids. The 17-keto group may be reduced to the 17β-hydroxy group, for example, by treatment with sodium borohydride, or with hydrogen in the presence of a nobel metal catalyst. Furthermore, substituents may be introduced in position 17α, preferably by reacting the corresponding 17-keto derivative with organometallic reagents such as, for example, Grignard reagents of the formula $R^2MgX$ in which $R^2$ represents a lower alkyl group and X represents a halogen with an atomic weight greater than 19, or with alkali metal acetylides, or with 2- or 3-furyllithium, or with 2- or 3-thienyllithium, decomposing the reaction mixture and isolating the desired product.

Thus, when starting with a lower aliphatic acyl ester, a lower alkyl ether, or the 2-tetrahydropyranyl ether of equilin, the corresponding 3-acyloxy, 3-alkoxy, or 3-(2-tetrahydropyranyloxy) derivative of 7α,8α-difluoromethylene-1,3,5(10)-estratrien-17-one is obtained. The latter compounds may be reduced with sodium borohydride or with hydrogen in the presence of a noble metal catalyst to the corresponding 3-acyloxy, 3-alkoxy, or 3-(2-tetrahydropyranyloxy) derivative of 7α,8α-difluoromethylene-1,3,5(10)-estratrien-17β-ol. Alternatively, the above derivatives of 7α,8α-difluoromethylene-1,3,5(10)-estratrien-17-one may be reacted with a lower alkyl magnesium halide, with an alkali metal acetylide, or with 2- or 3-furyllithium or 2- or 3-thienyllithium, to yield with concomitant hydrolysis of a 3-acyloxy group, if present, the corresponding 3-hydroxy, 3-alkoxy, or 3-(2-tetrahydropyranyloxy) derivatives of 7α,8α-difluoromethylene-1,3,5(10)-estratrien-17β-ol such as, for example, the 17α-(lower alkyl), 17α-ethynyl, 17α-(lower alkyl)ethynyl, 17α-[2′-furyl], 17α-[3′-furyl], 17α-[2′-thienyl], or 17α-[3′-thienyl] deriavtives.

The following examples will illustrate this invention.

EXAMPLE 1

7α,8α-difluoromethylene-3-methoxy,1,3,5(10)-estratrien-17-one

To a stirred solution of 10 g. of equilin 3-methyl ether in 165 ml. of anhydrous diethylene glycol dimethyl ether kept at gentle reflux under a nitrogen atmosphere is added dropwise a warm (60°) solution of 86 g. of sodium chlorodifluoroacetate in 210 ml. of anhydrous diethylene glycol dimethyl ether.

The cooled reaction mixture is filtered and the cake washed thoroughly with diethylene glycol dimethyl ether. The solvent is removed under reduced pressure at a temperature not above 40° and the dark residue is chromatographed on 650 g. of silica gel (Merck, 0.05–0.2 mm.) eluting with hexane ethyl acetate 80:20, to yield the title compound with M.P. 135–136° C., $[\alpha]_D^{24}$ +209.6° (CHCl$_3$) after crystallization from methylene chloride-methanol.

In the same manner, but using as starting material the 3-acetoxy, 3-propionyloxy, 3-butyryloxy, 3-ethoxy, 3-propoxy, 3-butoxy, 3-pentyloxy, 3-hexyloxy, 3-heptyloxy, 3-octyloxy, 3-cyclopentyloxy, 3-cyclohexyloxy, or 3-(2-tetrahydropyranyloxy) derivatives of equilin, the corresponding 3-acetoxy-, 3-propionyloxy-, 3-butyryloxy-, 3-ethoxy-, 3-propoxy-, 3-butoxy-, 3-pentyloxy-, 3-butyloxy-, 3-heptyloxy-, 3-octyloxy-, 3-cyclopentyloxy-, 3-cyclohexyloxy-, and 3-(2-tetrahydropyranyloxy)-7α,8α-difluoromethylene-1,3,5(10)-estratrien-17-one are also obtained.

EXAMPLE 2

7α,8α-difluoromethylene-17α-ethynyl-3-methoxy-1,3,5(10)-estratrien-17β-ol

Sodium acetylide (18 ml. of a 20% suspension in dry xylene) is centrifuged and washed three times with 25 ml. portions of anhydrous tetrahydrofuran. It is then suspended in 40 ml. of dry dimethylsulfoxide and added dropwise to a cooled suspension of 4.28 g. of 7α,8α-difluoromethylene-3-methoxy-1,3,5(10)-estratrien-17-one in 24 ml. of dry tetrahydrofuran and 32 ml. of dry dimethylsulfoxide. After about 5 minutes the cooling bath is removed and stirring is continued at room temperature until the reaction is complete. The reaction mixture is cooled and 160 ml. of water is added dropwise followed by extraction with benzene. The solution is dried and the solvent removed under reduced pressure to yield the crude product as residue. This is chromatographed on 400 g. of silica gel (Merck, 0.05–0.2 mm.), eluting with hexane-ethyl acetate (80:20), to yield the title compound with M.P. 133–135° C., $[\alpha]_D$ +65.8° (CHCl$_3$) after crystallization from methylene chloride-hexane.

*Analysis.*—Calculated for $C_{22}H_{24}F_2O_2$ (percent): C, 73.72; H, 6.74. Found (percent): C, 73.41; H, 6.62.

In the same manner, but using methyl magnesium iodide, 2-furyllithium, 3-furyllithium, or 2-thienyllithium instead of sodium acetylide, the following compounds are obtained:

7α,8α-difluoromethylene-17α-methyl-3-methoxy-1,3,5(10)-estratrien-17β-ol,

7α,8α-difluoromethylene-17α-[2′-furyl]-3-methoxy-1,3,5(10)-estratrien-17β-ol, $\nu_{Max.}^{CHCl_3}$ 1010 cm.$^{-1}$ 7α,8α-difluoromethylene-17α-[3′-furyl]-3-methoxy-1,3,5(10)-estratrien-17β-ol, $\nu_{Max.}^{CHCl_3}$ 857 cm.$^{-1}$ 7α,8α-difluoromethylene-17α-[2′-thienyl]-3-methoxy-1,3,5(10)-estratrien-17β-ol, NMR: δ8.68–7.4 p.p.m. (multiplet).

Again in the same manner, but using 7α,8α-difluoromethylene-3 - (2 - tetrahydropyranyloxy) - 1,3,5(10)-estratrien-17-one as starting material, the following compounds are obtained:

7α,8α-difluoromethylene-17α-ethynyl-3-(2-tetrahydropyranyloxy)-1,3,5(10)estratrien-17β-ol, 7α,8α-difluoromethylene-17α-methyl-3-(2-tetrahydropyranyloxy)-1,3,5,(10)-estratrien-17β-ol, 7α,8α-difluoromethylene-17α-[2′-furyl]-3-(2-tetrahydropyranyloxy)-1,3,5(10)-estratrien-17β-ol, 7α,8α-difluoromethylene-17α-[3′-furyl]-3-(2-tetrahydropyranyloxyl)-1,3,5(10)-estratrien-17β-ol, 7α,8α-difluoromethylene-17α-[2′-thienyl]-3-(2-tetrahydropyranyloxy)-1,3,5(10)-estratrien-17β-ol.

EXAMPLE 3

7α,8α-difluoromethylene-17α-ethynyl-1,3,5(10)-estratriene-3,17-diol

7α,8α - difluoromethylene - 17α - ethynyl-3-(2-tetrahydropyranyloxy)-1,3,5(10)-estratrien-17β-ol (1.0 g.), obtained as described in Example 2, is dissolved in 10 ml. of methanol and 1 ml. of 10% hydrochloric acid is added. After standing for one hour, the product is precipitated by dilution with water and isolated by filtration to yield the title compound with $\nu_{max.}^{CHCl_3}$ 3590, 3300 cm.$^{-1}$ In the same manner, by using the other tetrahydropyranyl ethers described in Example 2 as starting materials, the following compounds are obtained:

7α,8α-difluoromethylene-17α-methyl-1,3,5(10)-estratriene-3,17-diol,

7α,8α-difluoromethylene-17α-[2′-furyl]-1,3,5(10)-estratriene-3,17-diol, $\nu_{max.}^{CHCl_3}$ 1005 cm.$^{-1}$ 7α,8α-difluoromethylene-17α-[3′-furyl]-1,3,5(10)-estratriene-3,17-diol, $\nu_{max.}^{CHCl_3}$ 880 cm.$^{-1}$ 7α8α - difluoromethylene - 17α-[2′-thienyl]-1,3,5(10)-estratriene-3,17-diol, NMR, δ8.68–7.4 p.p.m. (multiplet).

We claim:
1. A compound selected from those of the formula

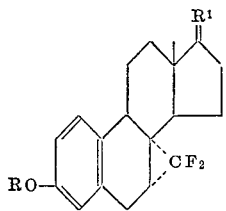

wherein R represents hydrogen, lower aliphatic acyl containing from 2 to 4 carbon atoms, lower alkyl containing from 1 to 8 carbon atoms, cycloalkyl containing from 5 to 7 carbon atoms or 2-tetrahydropyranyl; and $R^1$ represents ketonic oxygen or the group

wherein $R_2$ represents hydrogen, lower alkyl containing from 1 to 4 carbon atoms, lower alkynyl containing from 2 to 4 carbon atoms, lower dialkynyl containing from 4 to 8 carbon atoms, 2-furyl, 3-furyl, 2-thienyl or 3-thienyl.

2. 7α,8α-difluoromethylene - 3 - methoxy-1,3,5(10)-estratrien-17-one, as claimed in claim 1.
3. 7α,8α-difluoromethylene - 17α - ethynyl-3-methoxy-1,3,5(10)-estratrien-17β-ol, as claimed in claim 1.
4. 7α,8α-difluoromethylene - 17α - [2'-furyl]-3-methoxy-1,3,5(10)-estratrien-17β-ol, as claimed in claim 1.
5. 7α,8α - difluoromethylene-17α-[3'-furyl]-3-methoxy-1,3,5(10)-estratrien-17β-ol, as claimed in claim 1.
6. 7α,8α - difluoromethylene - 17α-[2'-thienyl]-3-methoxy-1,3,5(10)-estratrien-17β-ol, as claimed in claim 1.
7. 7α,8α - difluoromethylene - 17α - ethynyl-1,3,5(10)-estratriene-3,17-diol, as claimed in claim 1.
8. 7α,8α-difluoromethylene - 17α - [2'-furyl]-1,3,5(10)-estratriene-3,17-diol, as claimed in claim 1.
9. 7α,8α-difluoromethylene - 17α - [3'-furyl]-1,3,5(10)-estratriene-3,17-diol, as claimed in claim 1.
10. 7α,8α-difluoromethylene - 17α - [2'-thienyl]-1,3,5(10)-estratriene-3,17-diol, as claimed in claim 1.

No references cited.

HENRY A. FRENCH, Primary Examiner

U.S. Cl. X.R.
260—239.55, 397.4, 397.5, 999